(12) United States Patent
Cavusoglu Ataman et al.

(10) Patent No.: US 12,479,637 B2
(45) Date of Patent: Nov. 25, 2025

(54) CLOSURE SYSTEM AND KIT

(71) Applicant: HOFFMANN-LA ROCHE INC., Little Falls, NJ (US)

(72) Inventors: Nariye Salibryam Cavusoglu Ataman, Basel (CH); Monica De Bardi, Basel (CH); Guido Drees, Basel (CH); Maria Enterrios Quintana, Basel (CH); Joseph Alexander Martin, Basel (CH); Holger Roehl, Basel (CH); Thomas Peter Stuedeli, Basel (CH); Eszter Voros, Basel (CH); Neil Bentley Cammish, Basel (CH); Marcel Sigrist, Basel (CH)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 115 days.

(21) Appl. No.: 18/257,894

(22) PCT Filed: Dec. 17, 2021

(86) PCT No.: PCT/EP2021/086611
§ 371 (c)(1),
(2) Date: Jun. 16, 2023

(87) PCT Pub. No.: WO2022/129585
PCT Pub. Date: Jun. 23, 2022

(65) Prior Publication Data
US 2024/0051719 A1     Feb. 15, 2024

(30) Foreign Application Priority Data

Dec. 17, 2020  (EP) .................................... 20215176

(51) Int. Cl.
*B65D 55/06*     (2006.01)
*A61J 1/14*      (2023.01)
(Continued)

(52) U.S. Cl.
CPC .......... *B65D 55/066* (2013.01); *A61J 1/1412* (2013.01); *A61J 1/18* (2013.01); *B65D 39/0005* (2013.01);
(Continued)

(58) Field of Classification Search
CPC .. B65D 55/066; B65D 39/0005; B65D 45/16; B65D 51/002; B65D 51/18;
(Continued)

(56) References Cited

U.S. PATENT DOCUMENTS 3,587,897 A * 6/1971 Rohde ................. B65D 51/002
                                                    215/249
5,230,429 A    7/1993 Etheredge, III
(Continued)

FOREIGN PATENT DOCUMENTS

BE       526370 A1    2/1954
EP      2842884 A1    3/2015
(Continued)

OTHER PUBLICATIONS

Written Opinion and International Search Report issued Feb. 22, 2022 in Intl. Appl. No. PCT/EP2021/086611.
(Continued)

*Primary Examiner* — James N Smalley
(74) *Attorney, Agent, or Firm* — MEDLER FERRO WOODHOUSE & MILLS PLLC

(57) ABSTRACT

A closure system for closing a container opening is disclosed that includes a stopper member, a cage member for mounting to a container, a cover member reversibly mountable to the cage member, and an integrity visualization member. The stopper member has a plug portion to fit into the container opening and a cover portion to abut a boundary surface of the container opening. The plug portion of the stopper member is fitted into the opening of the container
(Continued)

and the cage member is mounted to the container. The cage member applies a force to the cover portion to push the cover portion onto the boundary surface of the container opening. The cover member covers an aperture of the cage member when mounted to the cage member. The integrity visualization member indicates an integrity of the closure system and is positioned between the cover portion and the cage member.

19 Claims, 6 Drawing Sheets

(51) Int. Cl.
*A61J 1/18* (2023.01)
*B65D 39/00* (2006.01)
*B65D 45/16* (2006.01)
*B65D 51/00* (2006.01)
*B65D 51/18* (2006.01)

(52) U.S. Cl.
CPC .......... *B65D 45/16* (2013.01); *B65D 51/002* (2013.01); *B65D 51/18* (2013.01); *B65D 2251/0015* (2013.01); *B65D 2251/0075* (2013.01); *B65D 2401/55* (2020.05)

(58) Field of Classification Search
CPC .... B65D 2251/0015; B65D 2251/0075; B65D 2401/55; A61J 1/1412; A61J 1/18
USPC .................................................. 215/247, 249
See application file for complete search history.

(56) References Cited

U.S. PATENT DOCUMENTS

| 7,780,024 B1 | 8/2010 | Marsella et al. |
| 9,567,143 B2* | 2/2017 | Carvajal .............. B65D 55/024 |
| 10,183,791 B2* | 1/2019 | Friedrich ............... B65D 41/44 |

FOREIGN PATENT DOCUMENTS

| EP | 3083435 B1 | 4/2017 |
| EP | 3286101 B1 | 8/2019 |
| EP | 3038941 B1 | 9/2020 |
| JP | S55-033246 A | 3/1980 |
| JP | H07-165252 A | 6/1995 |
| JP | H09-226817 A | 9/1997 |
| JP | 2016-529173 A | 9/2016 |
| WO | 2005/000703 A2 | 1/2005 |
| WO | 2015028482 A1 | 3/2015 |
| WO | 2015/082354 A1 | 6/2015 |

OTHER PUBLICATIONS

Third Party Observation for Application No. EP20210840007, "Closure System and Kit," 5 pp, Apr. 4, 2024.

* cited by examiner

CLOSURE SYSTEM AND KIT

TECHNICAL FIELD

The present invention relates to a closure system according to the preamble of independent claim 1 and more particularly to a kit having a container and such a closure system.

Such closure systems comprising an elastic stopper member having a plug portion configured to fit into an opening of a container and a cover portion configured to abut a boundary surface adjacent to the opening of the container can be used for tightly and securely closing the opening of the container, in particular, with respect to liquids and gases and, more particularly, pharmaceutical or chemical liquids or other fluidic substances.

BACKGROUND ART

In many chemical or pharmaceutical applications, liquid substances such as drug substances, chemical substances, substances of clinical trials or others are provided in specific containers such as vials, cartridges or the like. These containers typically have a hollow interior and an opening through which the interior is accessible. The opening typically is surrounded by a boundary surface. The substances are filled into the interior of the containers and the openings are subsequently tightly closed.

For closing the containers, it is known to use elastomeric stoppers. Such stoppers may provide for tightly or even hermetically sealing the openings and additionally to allow retrieval of the substances out of the containers by piercing the stoppers with needles and introducing the needles into the substances. Typically, stoppers have a plug portion and a cover portion, wherein the plug portion is dimensioned to tightly fit into the opening and the cover portion is shaped to abut the boundary surface of the opening. More specifically, the stoppers are pressed into the opening such that the cover portions are compressed to a certain extent to generate sufficient tightness. As required in many applications, stoppers and containers of the kind allow for an efficient aseptic filling and closing of the containers. Further, on an industrial scale, containers, such as particularly vials, and stoppers are often dimensioned in predefined sizes. Like this, automated processing with standard equipment can be efficiently allowed.

To achieve a sufficient tightness of the container after filling and closing, the stoppers have to be pressed into and/or onto surfaces of the containers. To hold the stoppers in such pressed state typically caps or cages are used which are arranged on and around the stoppers and openings. For example, it is known to arrange a rigid plastic cap around a head of a vial being closed with a stopper. Thereby, the head and at least part of the neck portion of the vial typically is completely covered by the plastic cap which holds the stopper in the pressed state. Or, it is known to crimp a partially formed metal cap about the head of the container and the cover portion of the stopper to fix and press the stopper to the container (crimp caps).

A problem which may occur with containers closed with today's solutions of stoppers and caps is that integrity of the closed container and, more specifically, the substances arranged therein cannot efficiently be verified or observed. For example, it is possible to remove the cap of one container, to access the interior of the container, e.g. by means of syringe piercing the stopper, and to close the cap again. However, integrity of the container closure can be crucial for ensuring that the container and the substance filled therein is in an appropriate condition for a medical application or the like. Also, assuring integrity may be important to prevent or detect tampering and/or counterfeiting.

Therefore, there is a need for a device or system allowing to ensure integrity of a container closure.

DISCLOSURE OF THE INVENTION

According to the invention this need is settled by a closure system as it is defined by the features of independent claim 1, and by a kit as it is defined by the features of independent claim 14. Preferred embodiments are subject of the dependent claims.

In one aspect, the invention is a closure system for closing an opening of a container. The container can be a container used in pharmaceutical or chemical research, development or production such as a cartridge. It can particularly be a vial.

The term "vial" as used herein can relate to vials in the literal sense, i.e. a comparably small vessel or bottle, often used to store pharmaceutical products or pharmaceuticals or medications in liquid, powdered or capsuled form. The vial can be made of a sterilisable material such as glass or plastic such as, e.g., polypropylene, a cyclic olefin copolymer or a cyclic olefin polymer.

The closure system comprises a stopper member, a cage member, a cover member reversibly mountable to the cage member, and an integrity visualization member. The term "member" in this connection and in the context of the following description can relate to a single piece unit. Such single piece unit can be embodied by fixing plural pieces or parts, e.g. made of different materials, together or to a monolithic element made of a single material or a monolithic element made of one or more materials that are chemically or physically bonded in the manufacturing process e.g. molding an opaque polymer over a transparent substrate or vice versa.

The stopper member is made of an elastic material and has a plug portion configured to fit and particularly tightly fit into the opening of the container as well as a cover portion configured to abut a boundary surface adjacent to the opening of the container.

The term "elastic" in connection with the stopper member can relate to properties of the material the stopper member is made of. More specifically, such material properties can be elasto-plastic and, in particular, compressible. Advantageously, the material of the stopper member allows it to be sterilized and to maintain aseptic conditions. The stopper member can be embodied as one piece, i.e. as a monolithic element. The plug portion can be essentially cylindrical such that it matches the geometry of the opening. To allow the cover portion to abut the boundary surface, the cover portion typically laterally or radially projects over the plug portion. It can be more or less disc shaped.

The closure system is configured to be in an assembled state in which the plug portion of the stopper member is fitted into the opening of the container and the cage member is mounted to the container.

The cage member is configured to be mounted to the container and to apply a force to the cover portion of the stopper member to push the cover portion of the stopper member onto the boundary surface of the opening of the container when the closure system is in the assembled state. Still further, the cage member has an aperture to access the cover portion of the stopper member when the closure system is in the assembled state.

The force applied by the cage member to the cover portion of the stopper member can be in a range from about 10 Newton (N) to about to about 100 N depending on the material characteristics and geometry of the stopper member. For example, it can be about 15 N. Like this, the stopper member can be compressed between the cage member and the boundary surface of the container such that an appropriate tightness between stopper member and container can be achieved and maintained.

The cover member covers the aperture of the cage member when being mounted to the cage member. The integrity visualization member is configured to indicate an integrity of the closure system and configured to be positioned between the cover member and the cage member when the closure system is in the assembled state.

The closure system is configured such that integrity indicated by the integrity visualization member is recognizable.

The term "integrity" as used herein can relate to an original or initial status of the closure of the container. Thereby, integrity can be achieved when the original or initial status of the closure is given. In particular, the container having integrity can relate to assuring that the container has not been previously opened, or that an interior of the container has not previously been accessed, e.g. by a needle through the stopper member.

The term "recognizable" as used in connection with the integrity visualization member can particularly relate to a visibility of the integrity visualization member or its status from an outside of the closure system in the assembled state. More specifically, advantageously a user or operator can see the integrity visualization member without opening the container or otherwise endangering tightness of closeness of the container.

By means of the integrity visualization member, it can be achieved that the closure system of the invention allows for efficiently recognizing if integrity of the closure of the container is existing or not. Inappropriate manipulation of the closed container eventually impairing quality or applicability of the container and, particularly, the substance arranged therein can be prevented. Also, any manipulation of the closure, e.g. for replicating the content of the container can be prevented or detected. Like this, the closed container can be tamper-proof.

Preferably, the cover member is made of a rigid material. It may further be an essentially disk-shaped element and can be provided with a connection structure to engage a corresponding connection structure of the cage member. For example, such connection structures may be a thread connection, a bayonet closure, clips or the like. Connection may also be by welding and/or via the application of force, heat and/or ultrasonic vibration. By means of such cover member, the cage member and particularly its aperture can be securely closed and protected.

The cover member preferably has a transparent window section configured such that the integrity visualization member is visible through the window section of the cover member when the closure system is in the assembled state. Such window section allows for efficiently recognizing the integrity of the closure system even in the assembled and completely closed state.

In a preferred embodiment, the integrity visualization member is an integrity masking member configured to be adhered to the cage member such that the aperture of the cage member is covered. By being an integrity masking member, the integrity visualization member can provide the aperture of the cage member being closed or sealed until integrity of the closure is cancelled. In other words, such embodiment allows to assure integrity of the closure system until the integrity masking member is removed such that the interior of the container can be accessed through the aperture of the cage member and through the stopper member. When removing the integrity masking member, also the integrity of the closure system is no longer indicated.

Preferably, the closure system is configured such that, in the assembled state of the closure system, the integrity masking member is visible through the window section of the cover member, when the integrity masking is adhered to the cage member, and the stopper member is visible through the window section of the cover member, when the integrity masking member is peeled off or otherwise removed from the cage member. Such configuration of the closure system can be achieved, e.g., by arranging the window section adjacent to the aperture of the cage member. For example, such arrangement can be embodied by a central, e.g. circular, window section.

Thereby, at least a section of the cover portion of the stopper member being visible through the aperture of the cage member has a stopper color, a section of the integrity masking member facing away from the aperture of the cage member when the integrity masking member is adhered to the cage member has a masking color, and the stopper color is different from the masking color. By involving such coloring, the integrity of the closure system can efficiently be recognized by the color visible in the window section of the closure member.

The integrity masking member preferably is configured to seal the aperture of the cage member, when the integrity masking member is adhered to the cage member. By such sealing, the stopper member being accessible though the aperture of the cage member can be held in a clean or aseptic state. This allows for securely accessing the interior of the container through the stopper member once the integrity masking member is removed from the cage member.

The integrity masking member preferably has a gripping lug configured to be held for peeling off the integrity masking member from the cage member, when the integrity masking member is adhered to the cage member. Such gripping lug allows for a convenient peeling off of the integrity masking member particularly by a hand of an operator or other user.

The integrity masking member preferably is dimensioned to cover the complete cage member. Such dimensioning allows for efficiently closing the aperture and for efficiently peeling off the integrity masking member.

In another preferred embodiment, the integrity visualization member is configured, in the assembled state of the closure system, to change in shape when the cover member is demounted from the cage member. Such configuration of the integrity visualization member allows for preventing the cover being removed and re-mounted without such action being detected or recognized.

Thereby, the integrity visualization member preferably comprises a rupture structure configured to at least partially tear when the cover member is demounted from the cage member. Such rupture structure allows for an efficient irreversible change in shape when demounting the cover member.

The integrity visualization member preferably is attached to the cover member. Particularly, when being embodied with a rupture structure such configuration allows for an efficient and safe implementation.

In all embodiments, the integrity visualization member preferably comprises a foil. The foil can allow for a comparably simple and efficient construction in various embodiments of the closure system.

The cage member can be made of a shape-retentive material. It further can have a stopper contacting section, a clipping structure and in intermediate section between the stopper contacting section and the clipping structure. The term "shape retentive" as used in this context relates to a material or structure being capable of maintaining its form when no force is applied. In particular, the shape retentive material can be dimensionally stable. Typically, shape-retentive materials are comparably rigid. Particularly, the material of the cage member can be more rigid than the material of the stopper member. Also, the shape-retentive material advantageously is sufficiently elastic to allow clipping as described below. The shape-retentive material can be a metal such as a steel and particularly a stainless steel. The stopper contacting section, the clipping structure and the intermediate section of the cage member advantageously are embodied as one piece, i.e. a monolithic element.

The stopper contacting section can be embodied to planarly or flatly abut at least a section of the cover portion of the stopper member. For example, it can have a shape of a circular disk or a flat ring dimensioned to cover a section of the stopper member being positioned on the boundary surface of the container when the stopper member is fitted into its opening. In particular, when being mounted, the cover section of the stopper member can be positioned axially between the boundary surface and the cage member wherein the stopper contacting section advantageously is designed to abut the complete surface of the cover section of the stopper member being opposite to the surface contacting the boundary surface of the container. Like this, it can be achieved that the stopper member is equally compressed at a comparably large portion when the stopper contacting section is pushed onto the cover portion as described below.

The clipping structure of the cage member can be configured to clip in a corresponding structure of the container. The term "clip" as used in this connection relates to snapping into or behind the corresponding structure, or a similar mechanism. Generally, such clipping typically involves an elastic deformation or dislocation of one element, such as the cage member, when moving two elements, such as the cage member and the container, together and then elastically deforming the one element back behind a structure of the second element once the two elements are properly positioned. More specifically, for allowing such clipping, the clipping structure of the cage member can be elastically deformed or bent relative to the other portions of the cage member. The clipping structure allows for providing a snap-fit connection between the cage member and the container. Once clipped or snap-fitted to the container, the cage element is in a form fit connection with the container. Advantageously, when being clipped to the container, the cage element cannot be removed from the container without being destroyed or broken.

The cage member can be configured such that the stopper contacting section of the cage member applies the force to the cover portion of the stopper member to push the cover portion of the stopper member onto the boundary surface adjacent to the opening of the container, when the plug portion of the stopper member is fitted into the opening of the container and the clipping structure of the cage member clips in the corresponding structure of the container.

The intermediate section of the cage member can be designed to surround a portion of the container adjacent to the boundary surface adjacent to the opening. In case the container is a vial or a similar container, the intermediate section can be configured to surround a head of the vial which at least partly comprises the opening and the boundary surface. Thus, the intermediate section of the cage member preferably is configured to surround a head portion of the container.

The intermediate section of the cage member can be cylindrical. Like this, the intermediate section can efficiently be designed to surround the head portion of the container or for other reasons such as asymmetry of interfacing connecting systems such as vial transfer devices. In particular, the intermediate section can have the shape of a small cylinder or ring. The term "small" in connection with the cylinder may relate to a cylinder having a height or axial length which is smaller than a diameter. The cylinder can particularly have a circular cross section.

The clipping structure of the cage member can comprise a plurality of tongues. For example, a number of the plurality of tongues can be in a range of about four to twelve, of about four to eight or of about six. Such tongues allow for providing an efficient and safe clipping of the cage member to the container. In particular, a rigidity and elasticity of the clipping structure can be suitably configured by means of such tongues. Also, the tongues may be configured to prevent the cage member from being detached from the container if it is clipped to the container.

Thereby, each of the tongues of the clipping structure of the cage member can be elastically movable relative to the intermediate section of the cage member. In particular, the cage member can be configured such that, when being clipped to the container, the intermediate section is essentially not deformed but the tongues are elastically moved. The elastic movability of the tongues, e.g., can be provided by tongues outwardly bending and/or by the tongues being tilted about a joint portion. In particular, the tongues can be elastically movable by being at least partially deformed in an elastic manner, i.e. tending to move back to the original shape and/or position. The tongues may allow for some normal relaxation due to material properties.

Further, each of the tongues of the clipping structure of the cage member can be elastically movable relative to the intermediate section of the cage member. In particular, the tongues may be elastically movable in a radial or outward direction.

The aperture can be provided in the stopper contacting section of the cage member. The aperture can particularly be located adjacent to a surface of the cover portion of the stopper member being in correspondence with the opening of the container when the stopper member is fitted into the opening and the cage member is clipped on the container. Thereby, the aperture can be aside the section of stopper contacting section abutting the surface of the cover section of the stopper member being opposite to the surface contacting the boundary surface of the container. Like this, the accessible portion of the stopper member can be easily accessed and cleaned, e.g., by alcohol swabbing. For example, the aperture of the stopper contacting section can be a circular central aperture of the stopper contacting section being a flat ring.

The cover portion of the stopper member can have a circumferential cage notch directed away from the boundary surface adjacent to the opening when the plug portion of the stopper member is fitted into the opening of the container. The term "directed away" in connection with the cage notch may particularly relate to a direction opposition to a direction towards the boundary surface adjacent to the opening of the container. For example, the cover portion can be more or less disk shaped having a top side and a bottom side opposite to the top side. Thereby, the cage notch may be positioned at the top side of the cover portion. The cage notch allows the stopper member to collapse when being pushed by the cage member. In particular, at a portion where the stopper contacting section of the cage member applies a force on the stopper member the cage notch may collapse in dependence of the force applied. Like this, a well-defined compression of the stopper member can be achieved and the risk of damaging the stopper member while being compressed can be reduced.

The cover portion of the stopper member can have a circumferential container notch directed towards the boundary surface adjacent to the opening when the plug portion of the stopper member is fitted into the opening of the container. The container notch allows the stopper member to collapse when being pushed onto the boundary surface of the container. In particular, at or adjacent to the boundary surface of the container notch may collapse in dependence of a force applied to the stopper member. Like this, a well-defined compression of the stopper member can be achieved and the risk of damaging the stopper member while being compressed can be reduced.

The stopper member can be equipped with the cage notch and the container notch. Thereby, the cage notch of the cover portion of the stopper member can be radially offset relative to the container notch of the cover portion of the stopper member. Like this, it can be prevented that stability of the stopper member is essentially decreased. Also, such offset positioning allows for providing a sophisticated collapsing at both sides of the cover portion, reducing the overall compression rate of the stopper. Like this, the stopper can be compressed more than a solid stopper for the same applied force. This is beneficial as it allows for a thicker stopper to compensate for rigid component tolerances.

The cover portion of the stopper member can have an edge section with a front face configured to abut the boundary surface adjacent to the opening of the container, and with a back face opposite to and corresponding to the front face of the edge section, wherein the stopper contacting section of the cage member is configured to abut the complete back face of the edge section of the stopper member when the plug portion of the stopper member is fitted into the opening of the container and the clipping structure of the cage member clips in the corresponding structure of the container. Such complete abutting allows for an efficient and homogenous compression of the stopper member.

The cage member can be configured to end essentially adjacent to the clipping structure when the plug portion of the stopper member is fitted into the opening of the container and the clipping structure of the cage member clips in the corresponding structure of the container. When the container is equipped with a head portion having the boundary surface adjacent to the opening passing over into a neck portion, the cage member can be configured essentially not to extend over the neck portion of the container or to end at start of the neck portion of the container. Like this, it can be achieved that the neck is kept free which allows an efficient handling of the closed container and attachment to standard or legacy accessories such as transfer kits, and an appropriate optical inspection of the complete interior of the container including the neck before, during or after transfer of the container contents.

In another aspect, the invention is a kit comprising a container and a closure system as described above, wherein the container comprises an opening for accessing an interior of the container and a boundary surface adjacent to the opening.

By means of the kit according to the invention the effects and benefits described above in connection with the closure system according to the invention and its preferred embodiments can efficiently be achieved.

BRIEF DESCRIPTION OF THE DRAWINGS

The closure system and kit according to the invention are described in more detail herein below by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented, and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
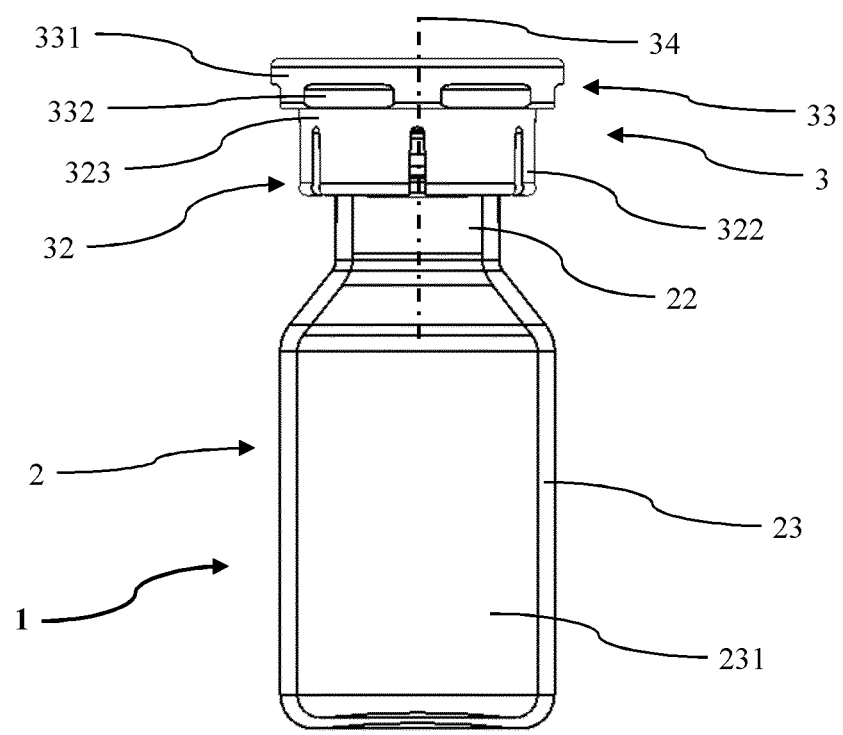
FIG. 1 shows a side view of a first embodiment of a kit according to the invention comprising a first embodiment of a closure system according to the invention.

FIG. 1 shows a first embodiment of a kit 1 according to the invention comprising a glass or plastic vial 2 as container and a first embodiment of a closure system 3 according to the invention. In FIG. 1 the kit 1 and closure system 3 are depicted in an assembled state where the closure system 3 is mounted to the vial 2.

The vial 2 has a body 23 with a hollow interior 231 and a neck 22 passing over into a head 21 as head portion. The closure system 3 is mounted to the head 21 of the vial 2 such that the head 21 is covered. The closure system 3 comprises a plastic cage 32 as cage member and a lid-like cover 33 as cover member. The cage 32 has an essentially cylindrical intermediate section 323 and a clipping structure with downwardly extending tongues 322 regularly distributed about the intermediate section 323. Furthermore, the closure system 3 defines a central axis 34 which is in one line with the central axis of rotation of the vial 2 when the closure system 3 is in the assembled state. The cover 33 comprises a frame portion 331 and a transparent body portion 332.

Figure 2:
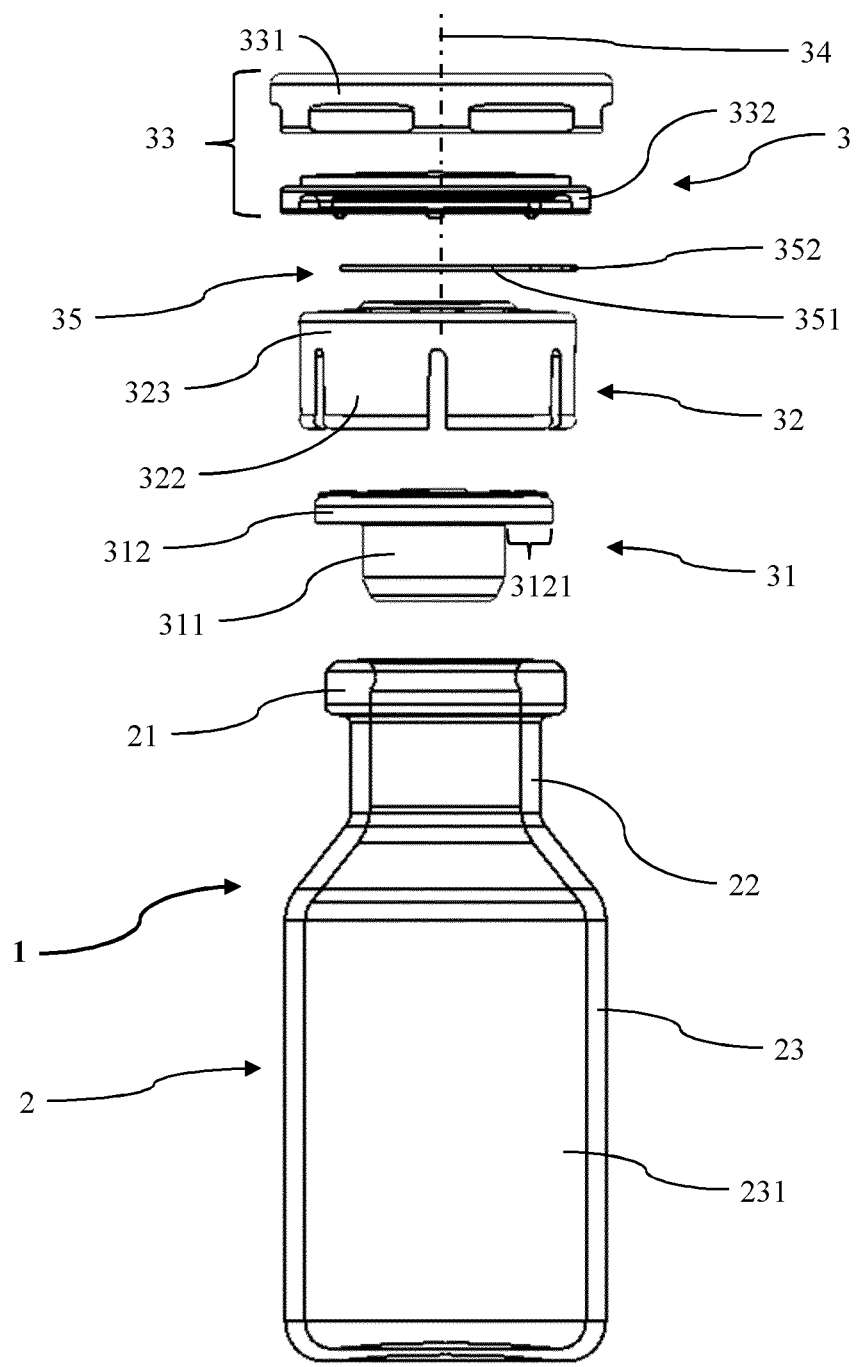
FIG. 2 shows an exploded side view of the kit and closure system of FIG. 1.

As can be seen in FIG. 2, the closure system 3 further comprises an elastic stopper 31 as stopper member. The stopper 31 has a plug portion 311 and a more or less disk-shaped cover portion 312. The cover portion 312 radially extends over the plug portion 311 thereby forming an essentially ring-shaped edge section 3121 having a downwardly oriented front face and an opposite upwardly oriented back face corresponding to the front face.

The head 21 of the vial 2 radially extends over the neck 22 of the vial 2. Between the body portion 332 of the cover 33 and the cage 32, an integrity masking member 35 is arranged as an embodiment of an integrity visualization member. The integrity masking member 35 consists of a foil forming a sealing portion 351 and a gripping lug 352.

Figure 3:
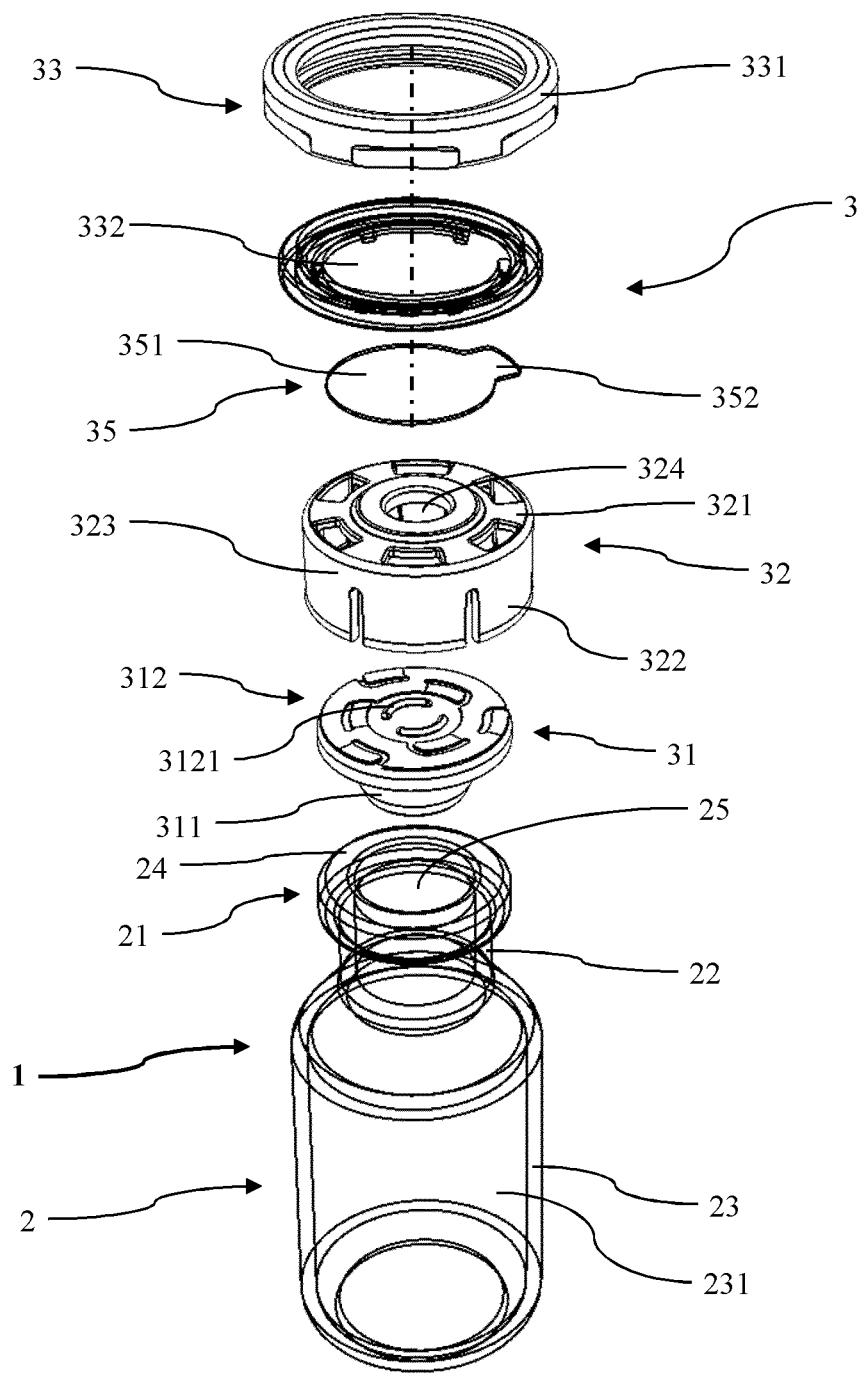
FIG. 3 shows an exploded perspective view of the kit and closure system of FIG. 1.

Furthermore, as best visible in FIG. 3, the vial 2 has a circular or cylindrical opening 25 at its head 21 which allows to access the interior 231 of the body 23. A boundary surface 24 adjacent to the opening 25 is designed as a flat upwardly oriented surface.

The cage 32 is made of a rigid but to a certain extent elastic plastic material. It has a more or less disk-shaped stopper contacting section 321 with a central aperture 324. The intermediate section 323 extends between the stopper contacting section 321 and the clipping structure with the tongues 322. The cover portion 312 of the stopper 31 is equipped with a cage centering structure 3121 at its top side.

The frame portion 331 of the cover 33 is essentially ring-shaped and the body portion 332 essentially disk-shaped. More specifically, the frame portion 331 and the body portion 332 are shaped such that the body portion 332 is mating in the frame portion 331 to form the single piece cover 33. Thereby, the body portion 332 provides a transparent circular window section centrally in the cover 33.

The sealing portion 351 of the integrity masking member 35 is circular and adhered to the top surface of the stopper contacting section 321 of the cage 32. Thereby, the integrity masking member 35 seals the aperture 324 of the cage 32. Moreover, the integrity masking member 35 has a colour clearly different from a colour of the stopper 31.

Figure 4:
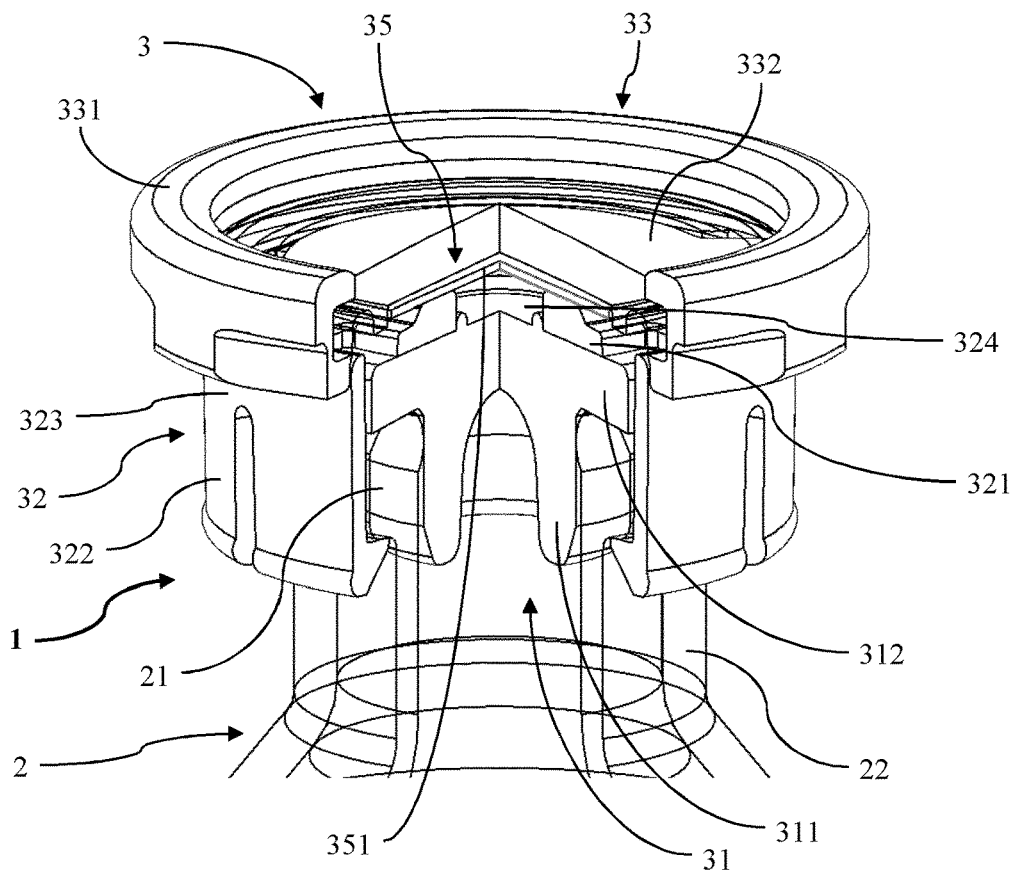
FIG. 4 shows a perspective view of a section of the kit and the closure system of FIG. 1, wherein a portion is cut such that internal structures are visible.

In FIG. 4 the closure system 3 is shown in the assembled state, wherein it is partially cut such that it can be seen how the single components of the closure system 3 interact. Thereby, it can be seen that the plug portion 311 of the stopper 31 is configured to tightly fit into the opening 25 of the vial 2. In particular, the plug portion 311 is dimensioned such that it is compressed when being pushed into the opening 25. The cover portion 312 abuts the boundary surface 24 adjacent to the opening 25 of the vial 2. The plug portion 311 has a dome-shaped cavity downwardly opening.

The tongues 322 are clipped below the head 21 of the vial 2 into its neck 22. More specifically, the tongues 322 have inwardly extending teeth which are arranged in the neck 22 and below the head 21. While being mounted, the tongues 322 are temporarily outwardly bent or dislocated into a radial direction relative to the intermediate section 322, wherein—due to the elasticity of the plastic material—they snap below the head 21 as soon as the cage 32 is sufficiently moved onto the vial 2. Thereby, a form-fit connection between the cage 32 and the vial 2 is established which prevents removal of the cage 32.

The intermediate section 323 of the cage member 32 is dimensioned such that the stopper contacting section 321 applies a force to the cover portion 312 of the stopper 31. More specifically, the stopper contacting section 321 pushes the edge section 3121 of the cover portion 312 of the stopper 31 onto the boundary surface 24 adjacent to the opening 25 of the vial 2. Thereby, the back face of the edge section 3121 abuts the stopper contacting section 321 and the front face of the edge section 3121 abuts the boundary surface 24. The force applied to the stopper 31 by the cage 32 deforms the edge section 3121 of the cover portion 321 of the stopper 32. Like this, a secure tight connection between the cover portion 321 and the boundary surface 24 is achieved. The centering structure 3124 of the cover portion 312 of the stopper 31 extends into the aperture 324 of the stopper contacting section 321 of the cage 32.

The frame portion 331 of the cover 33 has a radial annular groove in which the body portion 332 is arranged to be secured to the frame portion 331. Thereby, the central window section of the cover 33 is located on top of and adjacent to the sealing portion 351 of the integrity masking member 35 adhered to the cage 32. Like this, the integrity masking member 35 is visible through the window section or the body portion 351.

In operation of the kit 1, for accessing the interior 231 of the vial 2, the cover 33 is demounted from the cage 32 such that the integrity masking member 35 is accessible. The integrity masking member 35 is then peeled off the cage 32 by tearing the gripping lug 352. Thereby, the aperture 324 is exposed and the stopper 31 is accessible through the aperture 324. A needle of a syringe can now be pierced through the stopper 31 into the vial 2 and a substance arranged in the interior 231 of the vial 2 can be withdrawn. After remounting the cover 33 to the cage 32, the stopper 31 is visible through the window section of the cover 33. And since the stopper 31 has a colour clearly different from the colour of the integrity masking member 35, it can be immediately recognized from outside that integrity of the closure system is not given, i.e. that the interior 231 of the vial 2 may have been accessed.

Figure 5:
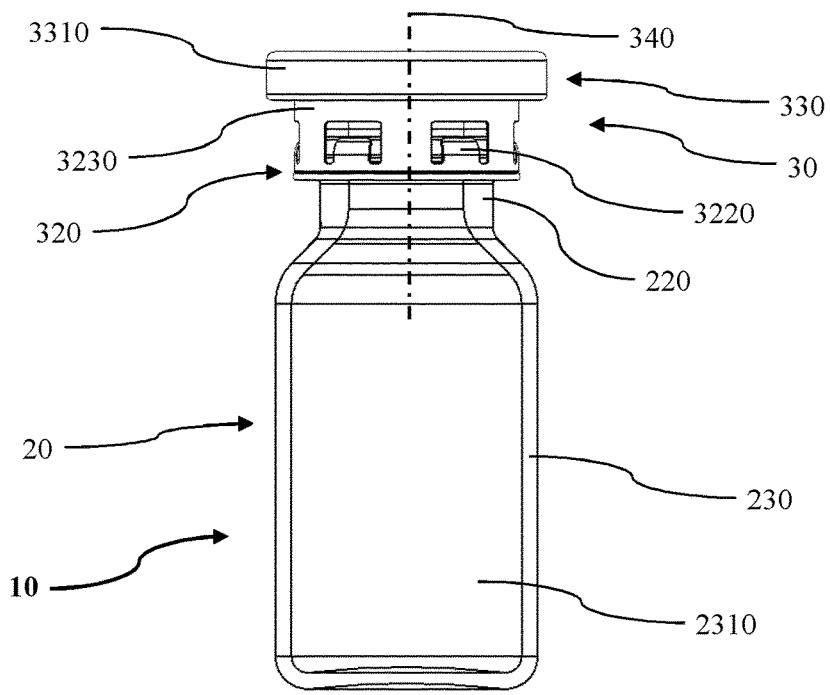
FIG. 5 shows a side view of a second embodiment of a kit according to the invention comprising a second embodiment of a closure system according to the invention.

FIG. 5 shows a second embodiment of a kit 10 according to the invention. The kit 10 comprises a vial 20 and a second embodiment of a closure system 30 according to the invention in an assembled state.

The vial 20 is a 13 mm (notional head diameter) vial made of glass or a plastic material. It has a body 230 with a hollow interior 2310 and a neck 220 passing over into a head 210 as head portion. The closure system 30 is mounted to the head 210 of the vial 20. The closure system 30 comprises a metal cage 320 as cage member and a lid-like cover 330 as cover member. The cage 320 has an essentially cylindrical intermediate section 3230 and a clipping structure with upwardly extending tongues 3220 regularly distributed about the cage 320. Furthermore, the closure system 30 defines a central axis 340 which is in one line with the central axis of rotation of the vial 20 when the closure system 30 is in the assembled state. The cover 330 comprises a frame portion 3310.

Figure 6:
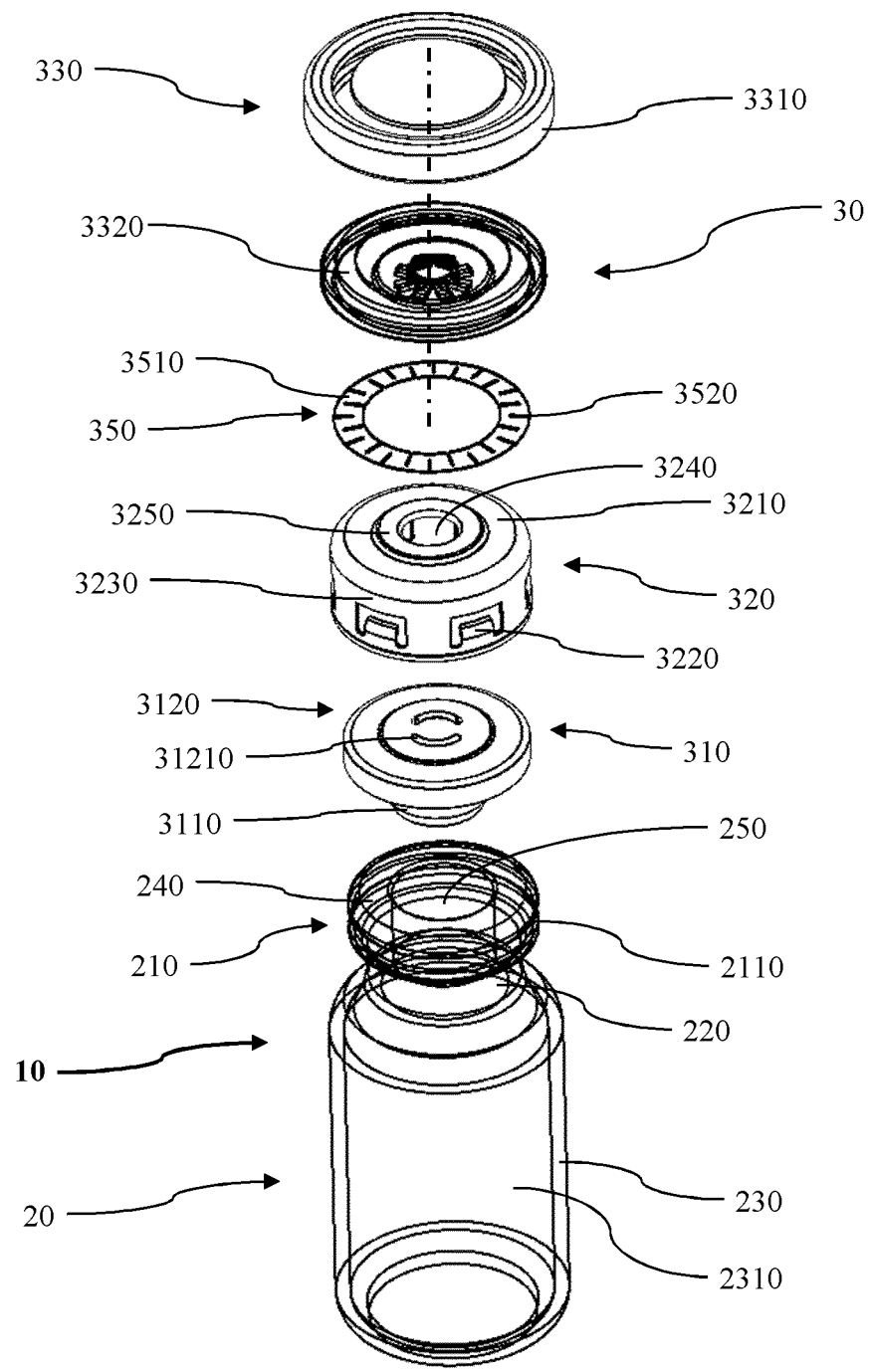
FIG. 6 shows an exploded perspective view of the kit and closure system of FIG. 5.

In FIG. 6 the kit 10 is shown in an exploded view. Thereby, it can be seen that the head 210 of the vial 20 radially extends over its neck 220 and is equipped with a radial indentation 2110 at its outer circumference. The vial 20 further has an opening 250 at the head 210 which allows to access the interior 2310 of the body 230. A boundary surface 240 adjacent to the opening 250 has a flat upwardly oriented face.

The closure system 30 further comprises an elastic stopper 310 as stopper member, which has a plug portion 3110 and a more or less disk-shaped cover portion 3120. The cover portion 3120 radially extends over the plug portion 3110 thereby forming an essentially ring-shaped edge section having a downwardly oriented front face and an opposite upwardly oriented back face corresponding to the front face. The cover portion 3120 of the stopper 310 is equipped with a cage centering structure 31210 at its top side.

The cage 320 is made of stainless steel. It has a more or less disk-shaped stopper contacting section 3210 with a central aperture 3240 surrounded by a first mating structure 3250. The intermediate section 3230 extends between the stopper contacting section 3210 and the clipping structure with the tongues 3220.

The frame portion 3310 of the cover 330 has an outer ring section and a central disk section, wherein an annular clearance is located between the outer ring section and the disk section. The cover further has a transparent body 3320 shaped such that the body portion 3320 is mating in the frame portion 3310 to form the single piece cover 330. Thereby, the body portion 3320 provides a transparent annular window section between the ring and disk sections of the frame portion 3310.

To a bottom side of the cover 330 an integrity visualization member 350 is mounted. The integrity visualization member 350 is made of a foil 3510 having a ring-like or annular shape dimensioned to cover the window section of the cover 330. The foil 3510 is provided with alternating radial incisions 3520 extending from the inner and outer ends as rupture structure. The foil 3510 has a distinctive colour.

Figure 7:
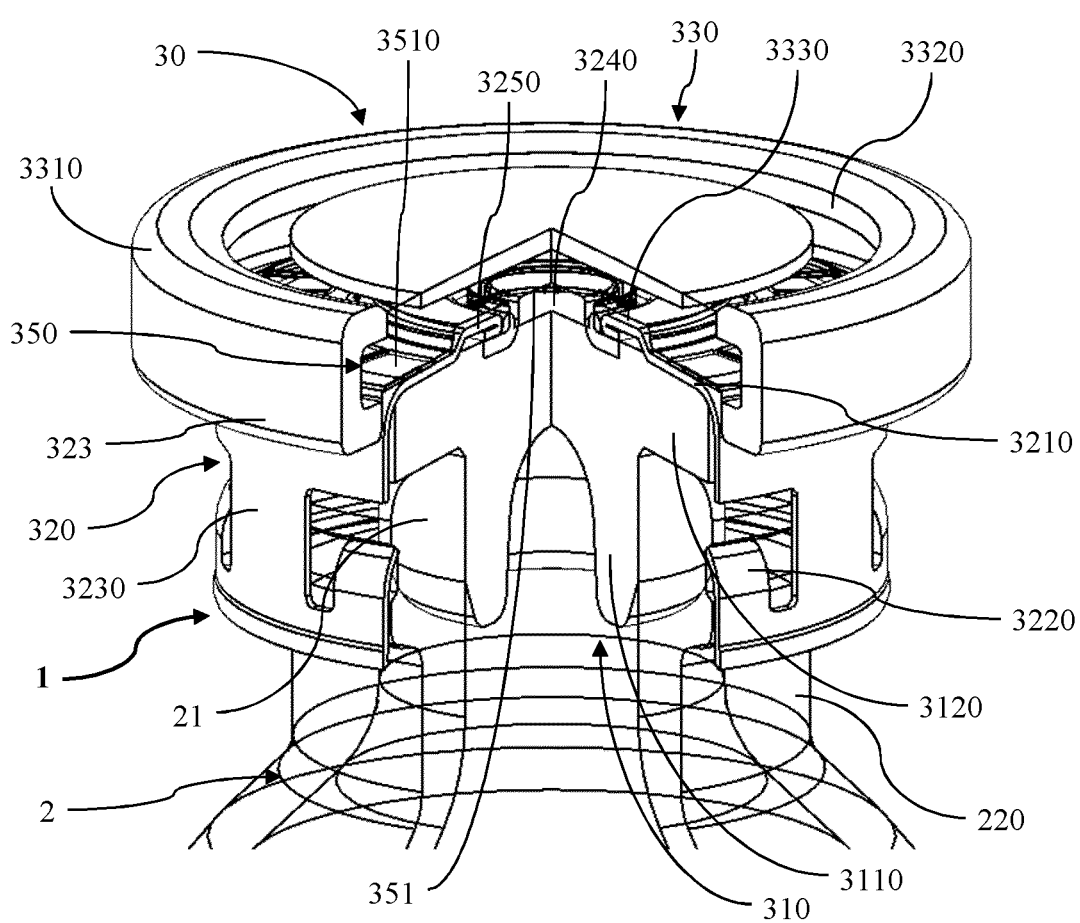
FIG. 7 shows a perspective view of a section of the kit and the closure system of FIG. 5, wherein a portion is cut such that internal structures are visible.

FIG. 7 shows the closure system 30 in the assembled state, wherein it is partially cut such that it can be seen how the single components of the closure system 30 interact. Thereby, it can be seen that the plug portion 3110 of the stopper 310 is configured to tightly fit into the opening 250 of the vial 20. In particular, the plug portion 3110 is dimensioned such that it is compressed when being pushed into the opening 250. The cover portion 3120 abuts the boundary surface 240 adjacent to the opening 250 of the vial 20. The plug portion 3110 has a dome-shaped cavity downwardly opening.

As mentioned, the intermediate section 3230 of the cage 320 extends between the stopper contacting section 3210 and the clipping structure with the tongues 3220. The tongues 3220 are clipped into the indentation 2110 of the head 210 of the vial 20. More specifically, the tongues 3220 upwardly extend and are curved inwardly towards the axis 340. When being mounted, the tongues 3220 are temporarily outwardly bent or dislocated into a radial direction relative to the intermediate section 3230, wherein—due to the elasticity of the stainless steel—they snap in the indentation 2110 as soon as the cage 320 is sufficiently moved onto the head 210 of the vial 20. Thereby, a form-fit connection between the cage 320 and the vial 20 is established which prevents removal of the cage 320 from the vial 20.

The intermediate section 3230 of the cage member 320 is dimensioned such that the stopper contacting section 3210 applies a force to the cover portion 3120 of the stopper 310. More specifically, the stopper contacting section 3210 pushes the edge section of the cover portion 3120 of the stopper 310 onto the boundary surface 240 adjacent to the opening 250 of the vial 20. Thereby, the back face of the edge section abuts the stopper contacting section 3210 and the front face of the edge section abuts the boundary surface 240. The force applied to the stopper 310 by the cage 320 deforms the edge section of the cover portion 3210 of the stopper 320. Like this, a secure tight connection between cover portion 3210 and the boundary surface 240 is achieved.

The body 3310 of the cover 330 is equipped with a downwardly oriented second mating structure 3330 corresponding to the first mating structure 3250 of the cage 320. The first mating structure 3330 is designed to receive the second mating structure 3250 to properly align and orientate the cover 330 to the cage 320 such that the cover 330 is securely and reversibly mounted to the cage 320 and the aperture 3240 of the cage 320 is closed. The integrity visualization member 350 is arranged between the cage 320 and the cover 330.

In operation of the kit 10, for accessing the interior 2310 of the vial 20, the cover 330 is demounted from the cage 320. More specifically, in order to demount the cover 330, it is deformed relative to the cage 320. By this deformation, due to the incisions 3520 provided in the foil 3510, the shape of the foil 3510 is changed. In particular, the foil 3510 is teared or dislocated at the incisions 3520.

After demounting the cover 330, the aperture 3240 of the cage 320 is exposed and the stopper 310 is accessible through the aperture 3240. A needle of a syringe can now be pierced through the stopper 310 into the vial 20 and a substance arranged in the interior 2310 of the vial 20 can be withdrawn. After remounting the cover 330 to the cage 320, the reshaped or teared foil 3510 is visible through the window section of the cover 330. Like this, it can be efficiently recognized from outside that integrity of the closure system 30 is not given, i.e. that the interior 2310 of the vial 20 may have been accessed.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A closure system for closing an opening of a container, comprising:
    a stopper member made of an elastic material and having a plug portion configured to fit into the opening of the container and a cover portion configured to abut a boundary surface adjacent to the opening of the container;
    a cage member configured to be mounted to the container;
    a cover member reversibly mountable to the cage member; and
    an integrity visualization member,
    wherein the closure system is configured to be in an assembled state in which the plug portion of the stopper member is fitted into the opening of the container and the cage member is mounted to the container,
    wherein the cage member is configured to apply a force to the cover portion of the stopper member to push the cover portion of the stopper member onto the boundary surface of the opening of the container when the closure system is in the assembled state,
    wherein the cage member has an aperture to access the cover portion of the stopper member when the closure system is in the assembled state,
    wherein the cover member covers the aperture of the cage member when being mounted to the cage member,
    wherein the integrity visualization member is configured to indicate an integrity of the closure system and configured to be positioned between the cover member and the cage member when the closure system is in the assembled state,
    wherein the closure system is configured such that integrity indicated by the integrity visualization member is recognizable, and
    wherein the integrity visualization member is an integrity masking member configured to be adhered to the cage member such that the aperture of the cage member is covered.

2. The closure system of claim 1, wherein the cover member is made of a rigid material.

3. The closure system of claim 1, wherein the cover member has a transparent window section configured such that the integrity visualization member is visible through the window section of the cover member when the closure system is in the assembled state.

4. The closure system of claim 3, wherein the integrity visualization member is an integrity masking member configured to be adhered to the cage member such that the aperture of the cage member is covered, and wherein the closure system is configured such that, in the assembled state of the closure system, the integrity masking member is visible through the window section of the cover member, when the integrity masking is adhered to the cage member, and the stopper member is visible through the window section of the cover member, when the integrity masking member is peeled off the cage member.

5. The closure system of claim 4,
    wherein at least a section of the cover portion of the stopper member being visible through the aperture of the cage member has a stopper color,
    wherein a section of the integrity masking member facing away from the aperture of the cage member when the integrity masking member is adhered to the cage member has a masking color, and
    wherein the stopper color is different from the masking color.

6. The closure system of claim 1, wherein the integrity masking member is configured to seal the aperture of the cage member, when the integrity masking member is adhered to the cage member.

7. The closure system of claim 1, wherein the integrity masking member has a gripping lug configured to be held for peeling off the integrity masking member from the cage member, when the integrity masking member is adhered to the cage member.

8. The closure system of claim 1, wherein the integrity masking member is dimensioned to cover the complete cage member.

9. The closure system of claim 1, wherein the integrity visualization member is configured, in the assembled state of the closure system, to change in shape when the cover member is demounted from the cage member.

10. The closure system of claim 9, wherein the integrity visualization member comprises a rupture structure configured to at least partially tear when the cover member is demounted from the cage member.

11. The closure system of claim 9, wherein the integrity visualization member is attached to the cover member.

12. The closure system of claim 1, wherein the integrity visualization member comprises a foil.

13. A kit comprising:
    a container; and
    a closure system according to claim 1,
    wherein the container comprises an opening for accessing an interior of the container and a boundary surface adjacent to the opening.

14. A closure system for closing an opening of a container, comprising:
    a stopper member made of an elastic material and having a plug portion configured to fit into the opening of the container and a cover portion configured to abut a boundary surface adjacent to the opening of the container;
a cage member configured to be mounted to the container;
a cover member reversibly mountable to the cage member; and
an integrity visualization member,
wherein the closure system is configured to be in an assembled state in which the plug portion of the stopper member is fitted into the opening of the container and the cage member is mounted to the container,
wherein the cage member is configured to apply a force to the cover portion of the stopper member to push the cover portion of the stopper member onto the boundary surface of the opening of the container when the closure system is in the assembled state,
wherein the cage member has an aperture to access the cover portion of the stopper member when the closure system is in the assembled state,
wherein the cover member covers the aperture of the cage member when being mounted to the cage member,
wherein the integrity visualization member is configured to indicate an integrity of the closure system and configured to be positioned between the cover member and the cage member when the closure system is in the assembled state,
wherein the closure system is configured such that integrity indicated by the integrity visualization member is recognizable,
wherein the integrity visualization member is configured, in the assembled state of the closure system, to change in shape when the cover member is demounted from the cage member, and,
wherein the integrity visualization member comprises a rupture structure configured to at least partially tear when the cover member is demounted from the cage member.

15. The closure system of claim 14, wherein the integrity visualization member is provided with alternating radial incisions as rupture structure.

16. The closure system of claim 15, wherein the integrity visualization member has a ring-like or annular shape.

17. The closure system of claim 16, wherein the alternating radial incisions extend from the inner and outer ends of the ring-like or annular shaped integrity visualization member.

18. The closure system of claim 14, wherein the integrity visualization member is made of a foil.

19. A kit comprising:
a container; and
a closure system according to claim 14,
wherein the container comprises an opening for accessing an interior of the container and a boundary surface adjacent to the opening.

* * * * *